(12) United States Patent
Glatman

(10) Patent No.: US 7,587,326 B1
(45) Date of Patent: Sep. 8, 2009

(54) PIPELINE POOL BALANCING METHOD

(75) Inventor: Rafail Glatman, Houston, TX (US)

(73) Assignee: Williams Gas Pipeline Company, Inc., Tulsa, OK (US)

( * ) Notice: Subject to any disclaimer, the term of this patent is extended or adjusted under 35 U.S.C. 154(b) by 1467 days.

(21) Appl. No.: 10/463,144

(22) Filed: Jun. 17, 2003

(51) Int. Cl.
*G06F 17/60* (2006.01)

(52) U.S. Cl. .............................................. 705/7; 705/8

(58) Field of Classification Search ............... 705/7, 705/8; 703/9, 10
See application file for complete search history.

(56) References Cited

U.S. PATENT DOCUMENTS

| | | | | |
|---|---|---|---|---|
| 4,835,687 | A * | 5/1989 | Martin | 705/7 |
| 5,983,164 | A | 11/1999 | Ocondi | |
| 6,047,274 | A | 4/2000 | Johnson et al. | |
| 6,263,315 | B1 | 7/2001 | Talluri | |
| 6,701,223 | B1 * | 3/2004 | Rachford et al. | 700/301 |
| 6,829,566 | B2 * | 12/2004 | Sage | 702/183 |
| 7,171,374 | B1 * | 1/2007 | Sheehan et al. | 705/8 |
| 2001/0005802 | A1 | 6/2001 | Arita et al. | |
| 2001/0007915 | A1 * | 7/2001 | Morris et al. | 585/899 |
| 2001/0032197 | A1 | 10/2001 | Chandra et al. | |
| 2002/0013757 | A1 | 1/2002 | Bykowsky et al. | |
| 2002/0019802 | A1 | 2/2002 | Malme et al. | |
| 2002/0035551 | A1 | 3/2002 | Sherwin et al. | |
| 2002/0038281 | A1 | 3/2002 | Lohmann et al. | |
| 2002/0040356 | A1 | 4/2002 | Gluck et al. | |
| 2002/0042700 | A1 * | 4/2002 | Giles et al. | 703/6 |
| 2002/0069188 | A1 | 6/2002 | Anekar et al. | |
| 2003/0023540 | A2 * | 1/2003 | Johnson et al. | 705/37 |
| 2007/0260333 | A1 * | 11/2007 | Peureux et al. | 700/28 |

OTHER PUBLICATIONS

Rassenti, S. and Reynolds, S. and Smith V. Contenancy and competition in an experimental auction market for natural gas pipeline networks. In Economic Theory, Springer-Verlag, 1994, vol. 4, pp. 41-65.*
Wong, P. and Larson, R. Optimization of Natural Gas Pipeline Systems Via Dynamic Programming. IEEE Transactions on Automatic Control, vol. AC-13, No. 5, Oct. 1968, pp. 475-481.*

(Continued)

*Primary Examiner*—Ramesh B Patel
*Assistant Examiner*—Dave Robertson
(74) *Attorney, Agent, or Firm*—Crowe & Dunlevy

(57) ABSTRACT

In accordance with a first aspect of the instant invention, there is provided a method of gas pool balancing which provides a method of simultaneously and systematically balancing an entire gas transmission network. In a first embodiment, the instant method operates by identifying pools with input amounts of gas available, numerically distributing that gas throughout a representation of the gas network, and, thereafter, physically distributing gas in that network according to the solution obtained. In another embodiment, the instant method operates by forming a system of equations that define the topology of the gas transmission network. Solution of the resulting system of equations yields a rapid and accurate system-wide solution to the gas balancing problem which heretofore was solved by repeated iterations of an algorithm which balanced one pool at a time.

24 Claims, 6 Drawing Sheets

OTHER PUBLICATIONS

Uraikul, V. and Chan, C.W. And Tontiwachwuthikul, P. Development of an Expert System for Optimizing Natural Gas Pipeline Operations. In Expert Systems with Applications, vol. 18, pp. 271-282.*

Chapmann KS. Virtual pipeline system testbed to optimize the US natural gas transmission pipeline system. Technology Status Assessment Report, 2002, [downloaded Jun. 7, 2009] from http://www.netl.doe.gov/technologies/oil-gas/, 7 pages.*

Qing Li, Seungwon An, and Thomas W. Gedra., "Solving natural gas loadflow problems using electric loadflow techhniques," in Proceedings of the North American Power Symposium, University of Missouri-Rolla, 2003, 7 pages.*

Fernandes, T.S.P.; Almeida, K.C., "A methodology for optimal power dispatch under a pool-bilateral market," Power Systems, IEEE Transactions on, vol. 18, No. 1, pp. 182-190, Feb. 2003.*

Rios-Mercado, R. Reduction Technique for Natural Gas Transmission Network Optimization Problems, Soming Wu, L. Ridgway Scott, E., Andrew Boyd, Annals of Operations Research 117, p. 217-234, 2002.*

Brooks, Dr. Robert E. and Neill, C.P., "Gridnet: Natural Gas Operations Optimizing System", Sep. 3, 2002.

Brooks, Dr. Robert E., RBA Consultants, "Optimizing Complex Natural Gas Models," presented at the annual INFORMS meeting, Summer, 1995.

* cited by examiner

PIPELINE POOL BALANCING METHOD

This invention relates generally to gas pipeline systems and more particularly concerns methods for balancing inputs and outputs in a gas transportation system.

BACKGROUND OF THE INVENTION

Conceptually, a natural gas transportation system may be thought of as a network of interconnected gas pipelines which are joined at discrete locations. Additionally, there will be locations within the network where gas can be added into the system or removed from it.

Within such a gas transportation system, the constituent pipelines receive requests for gas transportation (i.e., "nominations") from shippers who obtain gas at certain (receipt) locations along the pipeline and wish to transport it to some other (delivery) locations. While some of these requests specifically refer to actual physical locations where gas respectively enters and leaves the pipeline, a number of the requests involve logical locations within the network referred to as "pools" by those of ordinary skill in the art.

Within the context of a gas transportation network, a pool can be thought of as a booth at a trade show (or even a stall in an open-air market): pipeline customers gather their available gas at these specific locations, trade it to one another, and also submit nominations to transport gas from pools to the actual delivery points for their own customers. Since pools are just logical points on the pipeline, and not physical storage, no gas must be left in any pool at the end of the day. In other words, all of the market stalls must be emptied.

It is a primary goal of pool balancing to make certain that the sum of daily receipts into each pool is equal to the sum of daily deliveries from that pool. This goal is conventionally achieved by cutting the gas volume for some of the nominations that are involved in pooling.

Pool balancing typically involves three types of nominations: external receipts into a pool (requests to transport gas from real receipt points to pools), external deliveries (where gas is transported from pooling locations to actual delivery points), and pool-to-pool transactions (where gas is traded between pools belonging to different owners, which could also include transportation if these pools belong to locations associated with different parts of the pipeline). As an example, pool-to-pool transfers might be made for any number of reasons, but one popular reason is that such transfers provide a mechanism for pool owners that believe gas prices will go up during the month to buy extra gas on a long-term contract, or, alternatively, it allows other buyers with the opposite belief to make short-term gas purchases at the pools.

Ideally, nominations involving each individual pool should be balanced when they are submitted to the pipeline, but in reality that does not necessarily happen. For example, last-minute gas shortages or changes in demand, along with nominating discrepancies are quite common and can cause imbalances in one or more pools. In addition, physical and contractual constraints imposed by the pipeline itself frequently lead to nomination cuts, including cuts in pool external receipts and deliveries. All these factors can throw a particular pool out of balance, which typically affects pool-to-pool transfers; and, as a consequence, the whole pool system becomes unbalanced.

Those of ordinary skill in the art will recognize that the network of pool-to-pool transfers can include dozens (or, for larger pipelines, even hundreds) of pools that are directly or indirectly interconnected, which can make pool balancing a rather daunting task. For example, it is not uncommon that some of the gas transferred from pool A will go through pools B, C, D, and then back to pool A, resulting in what is known as a closed loop A→B→C→D→A. Of course, much more complex looping configurations are possible and are regularly encountered in practice.

Since pipelines make money by charging fees for gas transportation, it is to the advantage of the pipelines to achieve pool balancing by reducing the amount of transmitted gas as little as is possible. Of course, that strategy has the further favorable consequence of providing customers with a greater percentage of their gas request as well. Those of ordinary skill in the art will recognize that a strict set of rules must be followed when cutting nominations, rules which stem from the interlocking system of priorities assigned to the nominations by the pool owner (and possibly by other parties). If either incoming or outgoing nominations need to be cut to balance a pool, these priorities will determine the cut order for individual nominations.

Heretofore, pool balancing software programs have solved the above-described problem by sequentially balancing one pool at a time, e.g., by cutting the pooling nominations on either the receipt or the delivery side of each pool. These cuts are then taken into account when the next pool is analyzed, and so on, until all the pools have been examined. Of course, at the end of the first pass through the pools some of the previously balanced pools will likely have become unbalanced again (if, for example, a pool-to-pool transaction from Pool No. 25 to Pool No. 3 has been cut to balance Pool No. 25, then Pool No. 3 is now out of balance). So, a conventional pool balancing system will likely require several passes through the entire pool system, with the method continuing until a clean pass with no additional cuts is achieved. In practice, hundreds or even thousands of passes may be needed—if for no other reason because of the presence of closed loops—with resulting excessive cuts in the gas volumes.

Thus, what is needed is a method of gas pool balancing that provides an accurate and rapid determination of the cuts necessary to balance an entire network of pipelines and pools. Further, the method should reach a solution with relatively few passes through the system, thereby conserving computing resources and reducing the magnitude of rounding and other numerical errors.

Heretofore, as is well known in the gas transportation and trading arts, there has been a need for an invention to address and solve the above-described problems. Accordingly, it should now be recognized, as was recognized by the present inventor, that there exists, and has existed for some time, a very real need for a method of pool balancing that addresses and solves the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with a first aspect of the instant invention, there is provided a method of gas pool balancing which provides a method of simultaneously and systematically balancing an entire gas transmission network.

A first preferred step in the instant invention involves an examination of the gas transportation system to identify any independent groups of pools that might be present therein (i.e., an "independent group" is a collection of pools that do not exchange gas outside of that group). It should be clear that each independent group of pools may be separately processed and balanced, because a solution obtained for one independent group will not affect the solution for another independent group of pools.

As a next preferred step, based on the set of priorities assigned to individual nominations, the effective ranks for all pool-related transactions within a selected independent group are calculated, which may require splitting the input nominations into separate parts, each with its own distinct rank. These parts will be referred to as links hereinafter.

Next, it will preferably be determined whether the selected group as a whole is under-supplied or oversupplied and, in those instances where the group is oversupplied, it will be converted to an under-supply case by reversing the receipts and deliveries (i.e., mathematically reversing the flow direction) for the group. As a next preferred step, all of the available external gas volumes will be injected into the pool group and the resulting distribution of gas will be calculated.

A preferred next step is to identify the local oversupply situations and resolve them by backing gas out of oversupplied pools in the order dictated by the pool receipt ranks (i.e., the delivery ranks of links feeding gas into the pool), followed by restoration of the cut transactions within the limits of pool tolerance (the later step being preferably at least partially combined with the previous step). Finally, the transaction volumes will all be rounded off so that the pools remain balanced, and the rounding errors are kept to a minimum.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to apply to all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which.

DETAILED DESCRIPTION OF THE INVENTION

General Environment of the Invention

Figure 1:
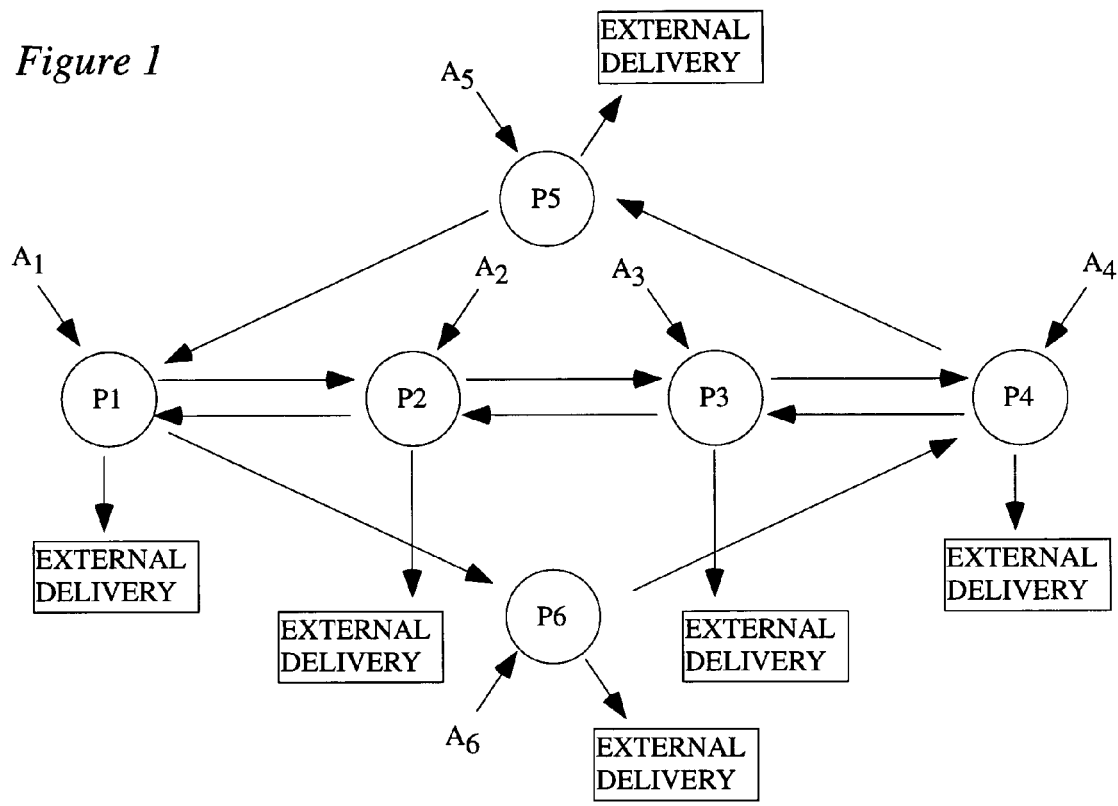
FIG. 1 provides a schematic illustration of a simple closed gas transmission network that includes a number of loops therein.

As is generally indicated in FIG. 1, it is conventional in a gas distribution network to describe the system as a plurality of pools that are in fluid communication with each other through discrete interconnections. In the example of FIG. 1, the designations P1 to P6 represent pools that may or may not correspond to actual gas aggregation locations within the network. Additionally, arrows in this figure schematically represent the interconnections between pools and, more importantly, the direction(s) in which gas is permitted to travel between the pools. Note that the quantities $\{A_i\}$ represent external receipts (i.e., "inputs") to the illustrated pool group. Needless to say, gas that is delivered into the system must ultimately be removed therefrom, hence the links that are notated as "external delivery".

Preferred Embodiments

Figure 7:
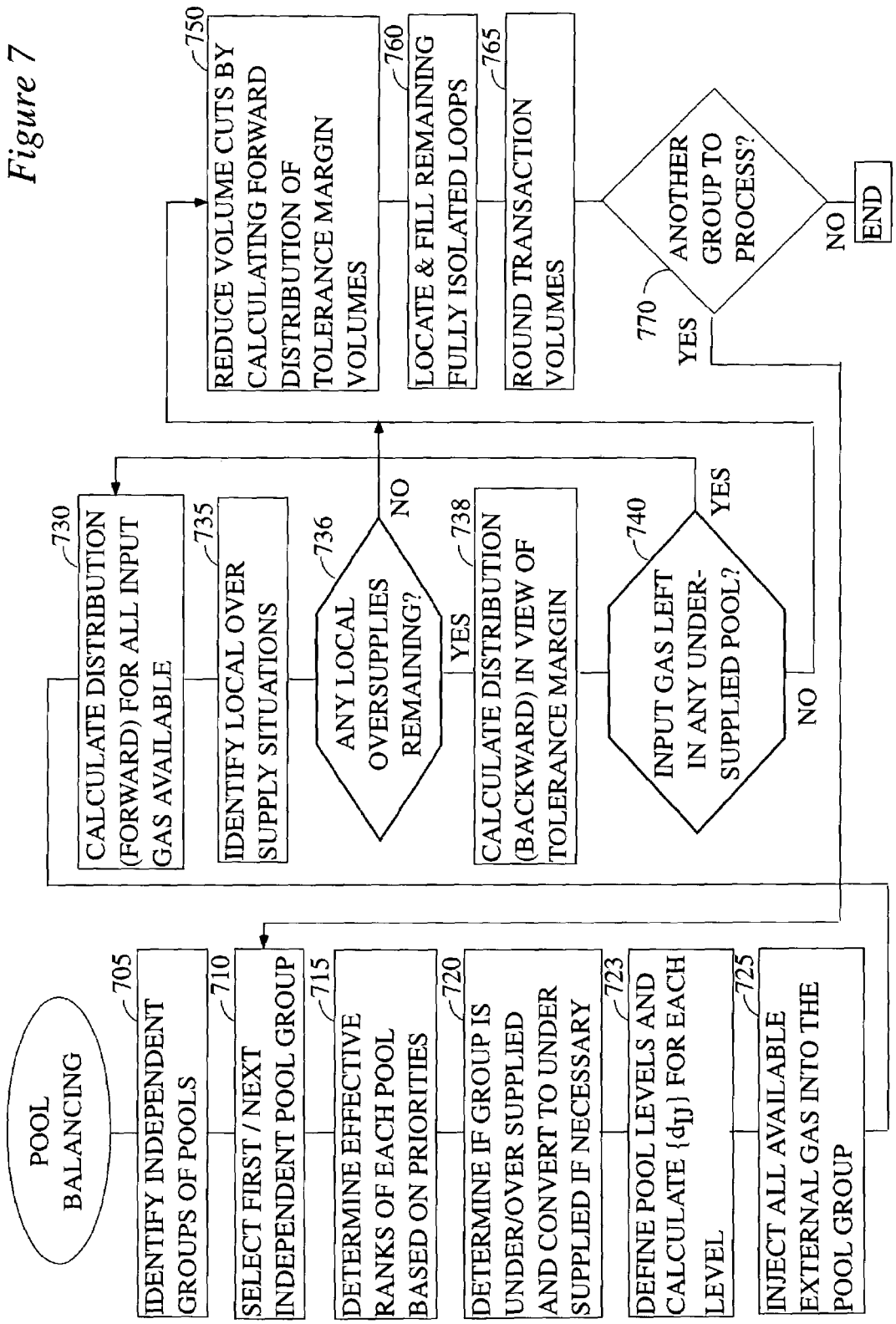
FIG. 7 contains a flow chart which outlines the preferred steps in the instant pool balancing method.

Turning now to a detailed description of the instant pool balancing invention, as a first preferred step, and as is generally illustrated in FIG. 7, the pipeline transportation system will be divided into independent groups of pools or subsystems that do not exchange gas with each other (step 705). That is, if there is a subset of the pools that do not communicate with other of the pools, each isolated subset should be extracted and processed independently so as to reduce the computational load and increase the overall numerical accuracy of the method. This step can potentially reduce the size of the problem many fold, depending on the number of independent subsystems/independent groups contained within the larger pipeline network. It should be clear to those of ordinary skill in the art that each such independent subsystem may be separately solved according to the methods of the instant invention.

Next, an independent pool group is selected 710 and the pools therein are mathematically "filled" with the externally received gas. Note that the order of filling is immaterial, since the objective at this stage is to determine how much gas is actually available in each pool. It is the amount of the available gas, not its source, that determines how much gas each out-of-pool delivery will receive. So the externally supplied gas will be traced through the group pools according to the delivery (i.e., takeaway) ranks of each pool, and the amount of gas that comes out will represent the balanced (and cut if necessary) delivery volumes out of the pools. If there is still gas "bottled" inside some pools, that scenario corresponds to the local oversupply situation. Metaphorically speaking, the whole process is akin to filling a set of partitioned reservoirs of different sizes, with the partitions being connected to the outside and to other reservoirs by a system of pipes; each pipe has a valve that opens and then closes in the prescribed sequence.

Additionally, those skilled in the art will recognize that a fully isolated loop can occur when exactly the same amount of gas travels along a closed circuit from pool to pool. These self-sustaining transactions may need to be identified separately, since they do not require any external gas. When such are identified, the fully isolated loops are filled to the greatest extent possible (i.e., until at least one link in the loop becomes saturated). The saturated link is then closed, thereby breaking the closed circuit.

As a next preferred step 715, the effective ranks for all pool-related transactions will be determined based on the set of priorities assigned to the individual nominations, which priorities are established by the pipeline customers pursuant to contract. Note that this may require splitting the input nominations into separate parts each with its own distinct ranks according to methods well known to those of ordinary skill in the art. Each such part will be referred to hereinafter for purposes of the instant disclosure as a "link".

It is important to note that during the balancing process a pool-related transaction can be cut from its original amount, but it can never be increased over that amount. As a consequence, it is preferred that a determination be made as to whether a pool group is initially under-supplied (more gas is nominated to leave the group via external transactions than is received into the group) or oversupplied. This latter situation can be converted to the under-supply case by mathematically reversing the direction of each transaction and keeping its pooling rank.

Thus, in the preferred arrangement, a determination 720 will be made as to whether the group that is currently under examination is under-supplied or oversupplied as those terms are known and understood in the art. In the event that the selected group is oversupplied, the preferred next step would be to reverse the receipts and deliveries (i.e., by reversing the flow directions), thereby converting the situation into one of undersupply. Thus, the discussion that follows may be limited without loss of generality to the case of undersupply.

A preferred method of making this determination is as follows. Note that the global undersupply/oversupply determination is based on the difference between the external receipts into the pool group and external deliveries out of that group. However, instead of using the initial volumes directly, the preferred embodiment utilizes a single value which is calculated from the input and output volumes. If the variables V and W are the summary external transportation volumes received into a pool and delivered out of it respectively, and v and w are their counterparts due to the internal pool-to-pool transactions, then it follows that after the completion of pool balancing $$V_{balanced} + v_{balanced} = W_{balanced} + w_{balanced}, \text{ or}$$

$$(V-W)_{balanced} = (w-v)_{balanced}.$$

Under the present assumptions, the volumes v and w can only decrease from their original values, $v_0$ and $w_0$, so that the maximum possible value of $(w-v)_{balanced}$ is $w_0$, and its minimum possible value is $-v_0$. As a consequence, instead of using the original V−W, the adjusted value $(V-W)_{adj}$ should be used, where $$-v_0 \leq (V-W)_{adj} \leq w_0.$$

The resulting external differences are accumulated for all the pools in a group, $$S = \sum_{all\ pools} (V-W)_{adj},$$

in order to determine whether the whole group is undersupplied (S<0) or oversupplied. If S=0 (a necessary, but not a sufficient condition for a balanced pool group), it is preferred that the pool group be processed via the instant method anyway (using the under-supply assumption, for example), in order to detect and correct possible local imbalances. Thus, the global variable S will be representative of the imbalances at individual pools, assuming that the pool-to-pool network connections are flexible enough and allow the effective gas exchange between pools. Once again, the violations of this assumption lead to "bottling" of gas inside some pools, and they will be identified and dealt with later in the process.

Next, it is preferable that the distribution coefficients be calculated for each pool in this pool group (step 723), where the distribution coefficients (represented by the coefficients $\{d_{ij}\}$, hereinafter) are known quantities that quantify the share of the volume available in pool "i" that is allocated to each of the other pools that are directly connected to it. An example of such a calculation is given below.

As a next preferred step 725, the available external gas volumes are injected into the pool group and the resulting distribution is thereafter calculated (step 730) according to methods set out below. Note that this is a "forward" calculation in the sense that the solution provides a way to distribute external gas into the pool group.

At this point, the pools will be balanced unless there is extra gas remaining in some of the pools (the local "bottling" of gas). As a consequence, the next preferred step 735 involves identifying such local oversupply situations (if any) and resolving them by backing gas out of oversupplied pools in the order dictated by the pool receipt ranks (which are delivery ranks of the links that bring gas into the pool).

In the event that a local oversupply situation is identified, the receipts into each oversupplied pool should be cut based on their priority (step 738). This process is very similar to tracing the external injections into pools, only in this instance gas is removed from the pools according to the reversed priority order on the pool receipt side, and the link capacities will be the actual amounts of gas that came into these pools during the fill process. In this way, only the gas that actually made it to the locally oversupplied pools is cut, and therefore no further processing of these pools will be needed. Additionally, each time a gas volume is "backed out" from an oversupplied pool to another pool, a check is preferably made to determine whether or not some of this gas could be sent to an under-supplied delivery, so that the necessary receipt volume cuts are minimized, and the delivery volumes are maximized.

In a preferred arrangement, all of the input volumes that are available within the network currently under consideration will be used, with each pool therein being considered in turn. Where there is an input volume in excess of the capacity of the currently selected pool level (a) the branch delivering that volume into the pool will not be traced any further, (b) volumes will be transferred out of that pool and subsequent pools until all input volumes are below open level capacities or until there are no more open levels; and, (c) the loops involving links that have become saturated in step (b) will be deactivated. Optionally, the distribution coefficients $\{d_{ij}\}$ may be recalculated in connection with steps 738 and/or 750. Note that, for purposes of the instant disclosure, a pool "level" will refer to a collection of links that all have the same priority or rank.

Thus, the distribution of gas will preferably be recalculated 738 according to the method discussed below (i.e., in connection with the algorithm of FIG. 8) and, in those cases where there is excess gas inside of a pool, it will be moved "out" of that pool via the "backward" distribution of step 738. This calculation is designed to provide a best possible redistribution of the excess gas within the pools so that inputs are cut as little as possible.

Note that each forward distribution can potentially create local over supplies in the open pools, and each backward distribution can potentially create additional input volumes that would be available to the under supplied pools. Accordingly, the preferred method continues with a check to determine whether or not there is still input gas left in any undersupplied pool (step 740). If so, the previous steps 730 through 738 will be repeated as necessary.

Next, and according to the preferred embodiment, some of the cut transactions will be restored within the limits of pool tolerance (step 750). Note that this step may very well be combined at least partially with the step 738.

Following this step, it is preferable that any remaining fully isolated loops be located and filled (step 760). This is done by identifying pools with currently open levels comprised of the pool-to-pool links only that (a) have not received any gas so far, and (b) that are not saturated (i.e., no gas has been backed out through them). Such pools are flagged, loops (if any) are identified and filled to the extent possible using a variation of the general distribution algorithm. Then the filled levels are closed, next levels are opened, and the processing repeated for the pools involved in the last identified set of isolated loops, until there are no more pools that satisfy the selection criteria.

Finally, it is preferable that the transaction volumes be rounded (step 765) so that the pools remain balanced, and the rounding errors are kept to a minimum. If there are additional groups to process 710, the instant method will continue by selecting another such group and applying the steps recited previously.

The Preferred Gas Distribution Method

Figure 8A:
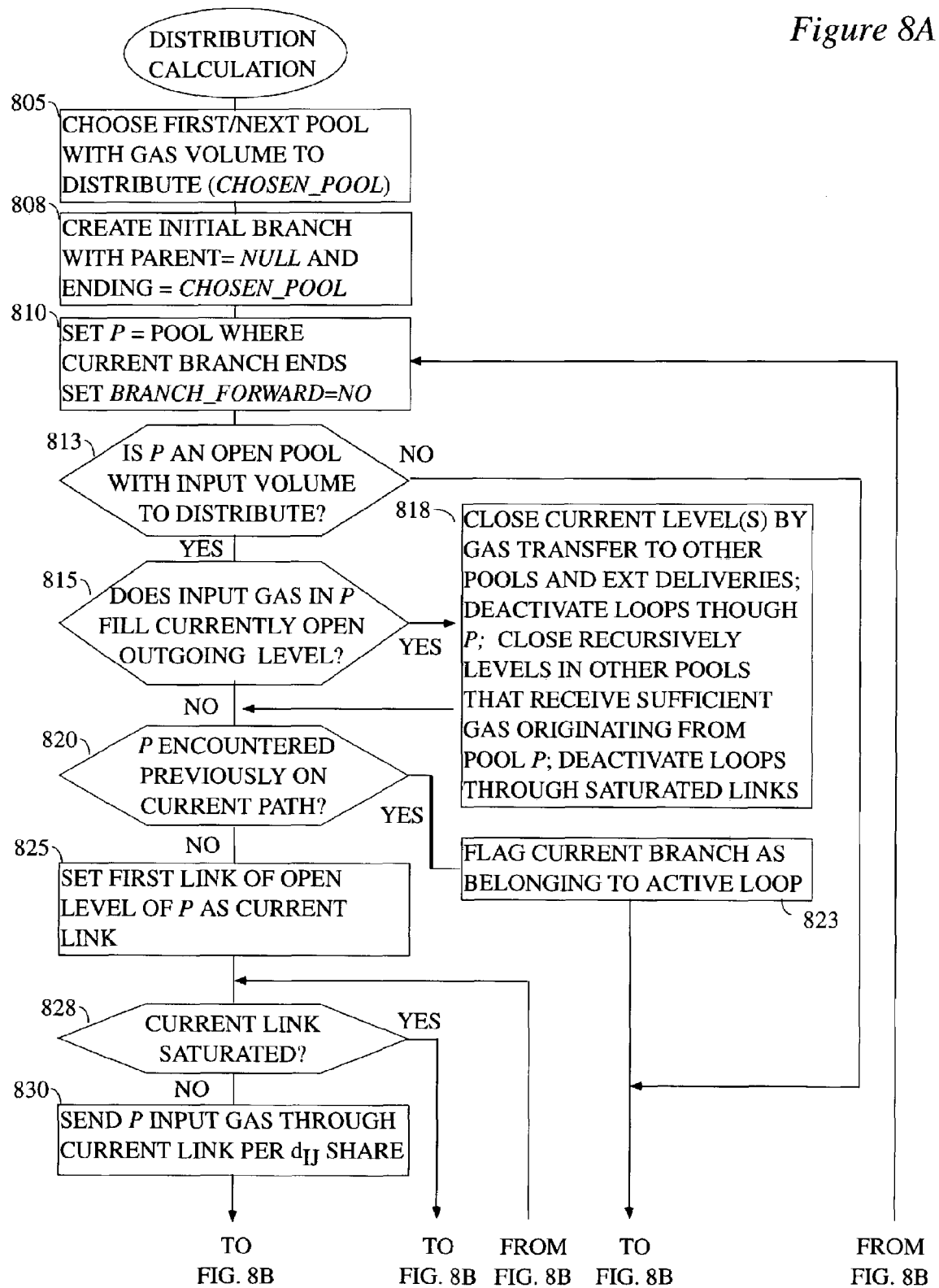
FIGS. 8A and 8B contains a flow chart which illustrates the preferred steps in the distribution calculation aspect of the instant invention.
Figure 8B:
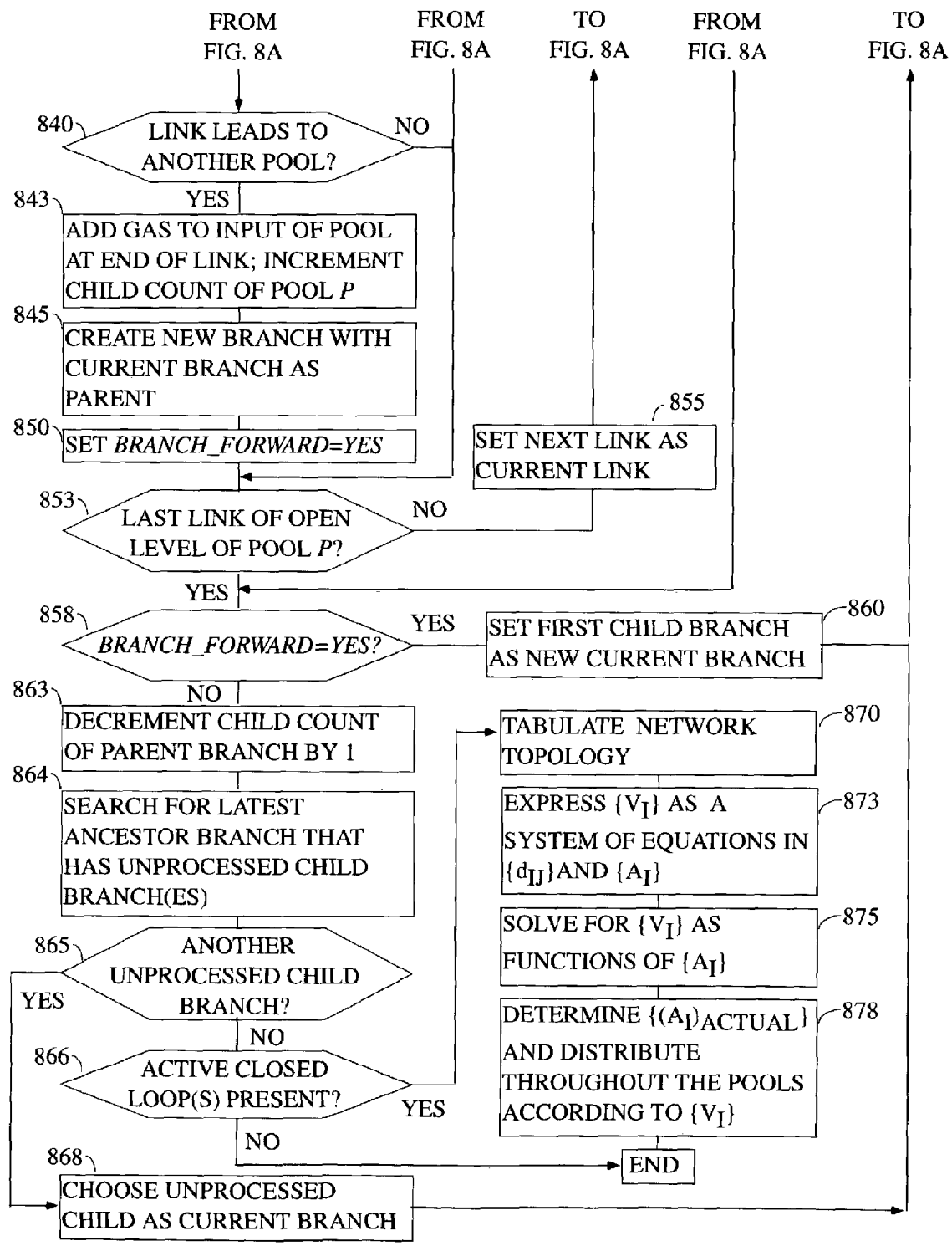

Turning now to a more detailed discussion of the gas distribution step 730 and as is generally illustrated in FIGS. 8A and 8B, gas volumes that have been introduced into a pool are distributed through a predefined set of outgoing links to outside deliveries and other pools. Each link receives gas in order of its relative priority, with the available gas being sent first to the links with highest priority, then, after these links are saturated, any additional volumes going to the links with the next highest priority, etc. This means that at any given time (or, rather, at any given processing stage) only a subset of outgoing links of the same priority is open. For pool s, each of these links will receive its share $d_{sk}$ of any pool input (where $1 \leq k \leq K_s$, $K_s$ is the number of open links).

In the method that follows (and as is illustrated generally in FIG. 8), gas is traced through the pool group starting with the volumes received from external sources (as opposed to transfers from other pools), keeping track of the total amount of gas injected into the pool. This amount determines which outgoing links are currently open. In the preferred arrangement, all of the incoming gas volumes are combined at this stage, since there is no way of sorting them by their priority (i.e., it is usually unknown how much gas actually comes from other pools, especially if these pool-to-pool transactions are ranked the same or higher than external receipts). For this reason, the preferred general strategy is as follows:

(a) All of the external receipts at each pool are combined;
(b) One of the pools that has such receipts is selected and its received volume traced along its outgoing links through other pools, adding to the mix other input volumes (external volumes and volumes actually received from other pools during the distribution process itself) available at those pools, until all the gas collected thus far is distributed to outside deliveries; and,
(c) The previous step is repeated for each input volume that is still available until all such volumes have been processed.

The previous approach might seem to be quite straightforward in theory, but, of course, in practice the problem can be complicated considerably by the presence of closed loops within the pool system. Further, there could be any number of active loops within the network that interact with each other, and the situation can become quite complex. Note that, conventionally, the presence of closed loops would make it necessary to go sequentially from pool to pool following the same set of complicated distribution patterns, chasing gradually diminishing transaction volumes, until those volumes become small enough to drop under the selected precision threshold of the calculations.

However, the method described herein addresses looping in a more general and effective way. In the regard, note that, first, that loop configurations change dynamically as more gas comes into participating pools: saturated links are closed and new ones are opened. For this reason, it is important to push through the gas volumes capable of saturating the currently open links. In other words, the amount of gas sitting on input to any pool should always be less than is needed to saturate the currently open link(s).

Second, except for the previously described situation, each loop configuration will preferably be traversed at least twice—the first time, when all of the interacting loops are identified, and the second time, when this loop configuration is either saturated, or all the available gas for this configuration is distributed. The preferred method attempts to limit the number of passes to just two in all cases.

Finally, in the analysis that follows it will be assumed that there is only one active link with the same direction of flow connecting any two pools. That is not a restrictive assumption, however, because in the alternative case (i.e., when there is more than one active link) the multiple links can be simply summed together and treated for computational purposes as a single link with a capacity equal to that of the total of these separate links.

Turning now specifically to the method of FIGS. 8A and 8B, the preferred approach begins by selecting a particular pool (step 805) from within the pool group that has gas to distribute. Given the chosen pool, a preferred next step is to create a starting branch having no parent pool (i.e., parent=NULL) and ending at the chosen pool (step 808).

Next, a loop is entered which successively and recursively follows the available gas through branches leading away from the current pool P (generally, steps 810 through 868). In the preferred arrangement, during each pass through the loop another pool will be selected, the selected pool preferably being one which is the terminus of the current branch (step 810).

Within this loop, preferably next a series of checks are conducted which are designed to determine whether or not the selected pool is still open (step 813), whether the gas available in pool P is sufficient to fill the current outgoing level (step 815), and whether or not the selected pool has previously been encountered on the current path (i.e., whether it is part of a loop within the gas system, step 820).

In the event that the gas that is available for input in the selected pool P is sufficient to fill the currently open outgoing level (step 815), as is indicated in step 818, a variety of ministerial steps are preferably performed which include, closing the current level by transferring gas up to the capacity of the level, closing recursively levels in other pools that receive gas sufficient to meet their capacity, and deactivating loops through links belonging to closed pool levels.

The preferred method then proceeds by setting the first link of the open level of pool P to be the current link (step 825) followed by a check to see whether or not the link is already saturated (step 828). Assuming that the current link is not saturated, gas from pool P is sent through that link proportional to its $\{d_{ij}\}$ share (step 830). If the selected link leads to another pool (step 840), the transmitted gas must then be added to the input of that recipient pool (step 843), after which a new branch is created which has the current branch as its parent (steps 845 and 850). Next, an examination of the open links of the current pool is made (step 853) and, the next link is set to be the current link (step 855) and until all of the links have been processed.

After all of the links through the currently open pool level have been processed, the method proceeds to check whether the search is in the forward or backward direction (relative to the current pool, step 858). If the BRANCH_FORWARD parameter is "YES", the preferred method proceeds by decrementing the child count of the parent branch by "1" (step 863) and initiating a search for the latest ancestor branch that has an unprocessed child branch (i.e., with child count greater than zero). If there are additional unprocessed branches, one of the child branches that was located at step 864 is chosen to be the "current" branch and the routine returns to step 810 and proceeds through the above-discussed steps again. if this is the last link, the method proceeds to check whether the search is in the forward or backward direction (i.e., relative to the current pool, step 858).

However, if all of the children branches have been processed (i.e., the "NO" decision in step 865 is triggered), the method then continues by tabulating the network topology (step 870), which preferably includes the formulation in equation form of the loop configurations involving the interconnecting links encountered during the previous iterative process. In the preferred arrangement, all separate linked pool subgroups are identified and processed separately.

During the process of distributing the pools' gas throughout the network as described in FIG. 8, a list is preferably compiled of all pools through which this particular volume (or portion of this volume) has traveled. Each pool encountered is checked to see whether it is already on the list and, if so, a closed loop has been identified. Any loop so identified will be added to the list of the currently active loops (unless this loop is already saturated). Note that gas that has been transported completely around a loop is preferably left at the entry to the pool that represents the start of the loop, after which the method continues to check other branches. After the checking process has been completed, a list of all possible looping transactions will have been compiled for the current loop configuration. This list will preferably contain only looping pool-to-pool links and no links to external deliveries.

As a next step, the topology developed previously is reduced to symbolic form (step 873) which is suitable for solution by a general purpose computer. With reference initially to FIG. 1, let the variables $\{A_i\}$ represent the current input amounts of gas available for the "ith" pool and let $V_i$ equal the total amount of gas coming to pool "i" from all sources (i=1, 2, ..., n), where "n" is the number of pools in the subgroup. Then, it must be true for each pool that:

$$A_i + \sum_{j=1}^{n} d_{ji} V_j = V_i.$$

where the distribution coefficients $\{d_{ij}\}$ for each pool are known quantities that represent the share of the volume available in pool "i" that is allocated to each of the other pools that are directly connected to it. As a consequence, if $K_s$ is the number of open links out of pool s that deliver volumes to other pools, and $h_s$ is the proportion of the output from that pool that goes to external deliveries, then it follows that:

$$\sum_{k=1}^{K} d_{sk} = 1 - h_s.$$

Note that, for purposes of simplicity in the text that follows, the proportion of the output that goes to external deliveries ($h_s$) will not be specifically included in the computations, but instead will enter indirectly. By way of specific example and in reference to FIG. 1, if the actual delivery amounts out of the Pool 1 are 500 units to Pool 2, 300 units to Pool 6, and 200 units to external delivery, then it would be the case that:

$$d_{12} = \frac{500}{1000} = 0.5$$

$$d_{16} = \frac{300}{1000} = 0.3.$$

Of course, the coefficient $h_1=0.2$ (i.e., the volume share to be delivered to external delivery) need not be explicitly calculated but can be readily determined by subtraction if needed.

Note that the previous summation that involves the $\{A_i\}$ and $\{V_i\}$ can readily be rewritten as:

$$\sum_{j=1}^{n} c_{ji} V_j = A_i$$

using new coefficients $\{c_{ji}\}$, where:

$$c_{ji} = \begin{cases} -d_{ij}, & j \neq i \\ 1, & j = i \end{cases}$$

Note that the collection of $\{c_{ji}\}$ will typically be a rather sparse matrix of nonzero values, depending on the exact configuration of the pipeline network.

Now, turning again to the example of FIG. 1, the previous system of equations can be rewritten in the preferred form as (step 873):

$$V_1 = A_1 + d_{21} V_2 + d_{51} V_5$$

$$V_2 = A_2 + d_{12} V_1 + d_{32} V_3$$

$$V_3 = A_3 + d_{23} V_2 + d_{43} V_4$$

$V_4 = A_4 + d_{34}V_3 + d_{64}V_6$ $V_5 = A_5 + d_{45}V_4$ $V_6 = A_6 + d_{16}V_1$ or, more succinctly (and more generally) as:

$\vec{V} = \vec{A} + D\vec{V},$ where D is a n by n matrix of $\{d_{ji}\}$ coefficients and $\vec{A}$ is an n by 1 column vector of the input volumes, $A_i$. This system of equations, of course, may be readily solved (step 875) using standard matrix methods, so long as all of the matrices involved are of suitable rank:

$\vec{V} = (I-D)^{-1}\vec{A},$ where I is an identity matrix of order n. However, and as is indicated below, the specific solution that is preferably implemented is equivalent to calculating the necessary part of $(I-D)^{-1}$ first, and saving the results to be used with different vectors $\vec{A}$.

Generally speaking, once the $\{V_i\}$ have been determined, it should be clear that the gas volume that is expected to travel through each link $\{G_{ij}\}$ can easily be obtained via the following equation:

$G_{ij} = d_{ij}V_i.$

Of course, each such calculated volume must be compared against the actual capacity of the associated link to determine whether or not that volume would saturate the link. Additionally, and as will be described in more detail below, in some cases the total capacity of the link must be shared between one or more sources and, in such a case, the available capacity may need to be reduced by the amount of volume already allocated for use by other sources. This suggests the following general method for allocating actual inputs throughout the system (step 878):

1. Select an arbitrary one of the A-volumes, say $A_m$, and set it to a value greater than zero. Assuming that the other A-volumes have been set equal to zero, the resulting solution can be expressed as $V_i = \alpha_i A_m$ (where $\alpha_i$ is a set of known coefficients which depend on the topography of the network). If the capacity of the link between pools i and j is $C_{ij}$, then for each link it should follow that $C_{ij} \geq G_{ij} = d_{ij}\alpha_i A_m$, which leads to the condition:

$(A_m)_{actual} = \min(A_m, A^*),$ where $A^* =, \min\left(\dfrac{C_{ij}}{d_{ij}\alpha_i}\right),$ for all links.

2. If $A^* < A_m$, the amount of gas $\alpha_m A^*$ sent through the loop contour from pool m will result in saturating the contour; after that the remaining external amount from the same pool, $A_m - A^*$, will be sent through the new link configuration.
3. In the opposite case, i.e., when the whole external amount $A_m$ can be sent through the loop contour without saturating it, the available link capacities will be adjusted to reflect the incremental contribution of this volume, i.e., $(C_{ij})_{new} = C_{ij} - d_{ij}\alpha_i A_m$.

Afterward, another external volume will be selected and processed in exactly the same fashion as $A_m$.

The previous process continues by adding external volumes until either the loop configuration is saturated, or all the external volumes are used. Only after enough external gas has been collected, will the actual gas distribution take place— this is the single additional pass through the loop contour that was mentioned elsewhere.

Example Computation

By way of example and to illustrate the instant method, the list of links that follows was compiled from FIG. 1, and active loops have been denoted by the use of a underlining in combination with a bolded font:

1 → 2 → 1

1 → 2 → 3 → 2

1 → 2 → 3 → 4 → 3

1 → 2 → 3 → 4 → 5 → 1

1 → 6 → 4 → 5 → 1

1 → 6 → 4 → 3 → 4

1 → 6 → 4 → 3 → 2 → 3

1 → 6 → 4 → 3 → 2 → 1

For purposes of convenience Pool 1 was used as the starting point each time in tracing out the loops. Obviously, any other pool could have been used as a starting point instead.

If, as in the present example, there are one or more active closed loops present (step 866), the method preferably continues (step 870) by determining the topology of the gas network. In the example of FIG. 1, those of ordinary skill in the art will recognize that the following list of links completely and uniquely defines the example network:

1→2, 2→1, 2→3, 3→2, 3→4, 4→3, 4→5, 5→1, 1→6, 6→4.

Since all the pools are interconnected, there is a single loop configuration here, and a single pool subgroup.

Now, continuing with the example of FIG. 1 and for purposes of illustration only, let the distribution coefficients $\{d_{ij}\}$ be chosen as follows: $d_{12}=0.5$, $d_{23}=0.8$, $d_{34}=0.1$, $d_{45}=0.4$, $d_{51}=0.8$, $d_{21}=0.1$, $d_{32}=0.4$, $d_{43}=0.5$, $d_{16}=0.3$, $d_{64}=0.2$. Given this collection of coefficients, a partial solution may readily be determined to be:

$V_1 = 1.13423A_1 + 0.21712A_2 + 0.12963A_3 + 0.42777A_4 + 0.90738A_5 + 0.085553A_6,$ $V_2 = 1.50794A_2 + 0.63492A_3 + 0.31746A_4 + 0.063492A_6 + 0.77302V_1,$ $V_3 = 1.05263A_3 + 0.52632A_4 + 0.10526A_6 + 0.031579V_1 + 0.84211V_2,$ $V_4 = A_4 + 0.2A_6 + 0.06V_1 + 0.1V_3,$ $V_5 = A_5 + 0.4V_4,$ $V_6 = A_6 + 0.3V_1.$

Note that for purposes of computational convenience, the previous system of equations has not been completely solved but instead has been placed into a condition where the subject equations may be quickly solved by successive substitution given a set of $\{A_i\}$ values. In fact, this is the preferred method of solving very large systems of equations in practice (i.e., via Gaussian elimination).

Continuing with the previous example, note that if $A_1$ is set to be equal to 1000 (a value which has been chosen for purposes of computational convenience only), and if the remaining volumes are arbitrarily set to be equal to zero (i.e., if $A_2=A_3=A_4=A_5=A_6=0$), then it readily follows that $V_1=1134.2$, $V_2=876.8$, $V_3=774.2$, $V_4=145.5$, $V_5=58.2$, and, $V_6=340.3$. Note that this choice of $\{A_i\}$ has made it possible to trace the contribution by the input $A_1$ throughout the network.

Assume for purposes of illustration that the only link capacity that is near being exceeded is the link from pool 4 to pool 3 with $d_{43}=0.5$. Previously, the effects of the non-zero external contribution at pool 1 were calculated by setting $A_1=1000$ (in other words, step 878 above was begun with m=1). Under the present set of assumptions, the amount of gas traveling through the 4→3 link is readily calculated according to the instant method to be:

$$G_{43}=d_{43}V_4=0.5*145.5=72.75.$$

Additionally, and continuing with the distribution of the non-zero A-volume ($A_1=1000$ in this instance), the system of equations developed previously can be used to re-express each of the $V_i$'s in terms of this single non-zero value:

$$V_1=1.13423A_1,$$

$$V_2=0.77302*V_1=0.87678A_1,$$

$$V_3=0.0311579V_1+0.84211V_2=0.77416A_1,$$

$$V_4=0.06V_1+0.1V_3=0.14547A_1, \text{etc.},$$

so that, for example, $\alpha_4=0.14547$. Consider two possibilities:
(a) If $C_{43}=50<G_{43}$, then $$A^*=C_{43}/(d_{43}*\alpha_4)=687.4=(A_1)_{actual}.$$

In this scenario, gas should be distributed to external deliveries based on the calculated total pool volumes $V_1=1.13423*687.4=779.7$, $V_2=0.87678*687.4=602.7$, etc. The amounts of gas going through the links are calculated based on the same volumes. Given this calculated amount, the next link configuration will be considered using an external volume of $(A_1)_{new}=1000-687.4=312.6$.

(b) If $C_{43}=100$, then the entire volume $A_1=1000$ can be distributed, which would result in a remaining link capacity of $(C_{43})_{new}=100-72.75=27.25$. If the external volume available at Pool 2 is $A_2=200$, then the solution just for that volume will be:

$$V_1=0.21712A_2,$$

$$V_2=1.50794A_2+0.77302V_1=1.67578A_2,$$

$$V_3=0.031579V_1+0.84211V_2=1.41805A_2,$$

$$V_4=0.06V_1+0.1V_3=0.15483A_2, \text{etc.}$$

The additional volume going through the critical link would then be $$d_{43}V_4=0.5*0.030497*200=15.5<27.25.$$

If there are some more external volumes at other pools, this process can be continued adding each in turn. Otherwise, the summary volumes at the pools can be calculated to be $$V_1=1134.2+0.21712*200=1177.6,$$

$$V_2=876.8+1.67578*200=1212.0, \text{etc.}$$

It is these summary volumes that will be used to perform the actual volume distribution outside the loops in a single pass.

Finally, depending on over/under-supply situation, pool-to-pool transactions that involve fuel are preferably split into two components: the transaction that represents the transfer of the volume net of fuel, and either an external delivery of the same priority (global under-supply), or an external receipt of the same priority that always supplies gas at the same time the pool-to-pool gas along this link arrives (and in the same proportion). The capacity of such fuel links should be based on the net (actually delivered) volume—it is a fixed share of that volume based on the given fuel retention percentage.

Additional Comments Re Injecting and Distributing Gas

A preferred scheme for numerically tracing gas from pool-to-pool (step 730) is described as follows. In a preferred arrangement each time gas is sent from one pool to another, a new gas distribution branch is introduced. The branch parameters preferably include information such as a reference to the parent branch, the number of children branches not yet processed, the pool where this branch ends, reference to the specific link along which the gas has traveled, and a flag indicating whether this branch is part of an active loop. In a preferred arrangement, tracing of a branch stops when either (a) the gas is routed to an external delivery, or (b) the gas arrives at a closed pool (in which case it will be left in the input buffer), or (c) a loop is detected (in which case, the gas will also be left in the input buffer).

The preferred order of gas distribution can be described by the following general allocation rule: during the process of distribution it is permissible to leave gas in any input buffer and continue processing another branch, but if any amount of gas is being sent through the outgoing links, each currently open link should transport its proportionate amounts of gas. Accordingly in the preferred arrangement, each particular branch will only be traced down one level at a time, e.g., first all of the links from Pool 1 will be traced, then all of the links from a pool in communication with Pool 1, for example Pool 2 in FIG. 1.

Continuing with the previous idea, if a certain amount of gas originated at pool i and is transferred to pool j, it can preferably be directed further through the network (through the link j→k, for example) only after it has been determined that gas that has been sent along all of the links leaving pool i that are on the same priority level as link i→j. That is, assuming that an input volume has been selected which has pool "i" as a starting point, moving that gas through all active links i→{j}, creates the path records:

$$i \to j_1$$

$$i \to j_2$$

$$i \to j_3$$

$$\ldots$$

As a next step, the gas is distributed further from $j_1$ adding to the mix any gas that is already in its input buffer:

$i \to j_1 \to k_1$ $i \to j_1 \to k_2$

...

$i \to j_1 \to k_1 \to l_1$ $i \to j_1 \to k_1 \to l_2$

...

After the current path ends, go to the next path (thread) which originates from the same parent, e.g.: if $i \to j_1 \to k_1 \to l_5 \to m_{27}$ ends, switch to $i \to j_1 \to k_1 \to l_5 \to m_{28}$, etc. If the selected thread is the last from the parent, the instant method preferably continues by selecting next for processing its parent's parent ($i \to j_1 \to k_1 \to l_5$ in the instant example).

When the tracing of a selected input volume is completed, the loops encountered during the tracing should be resolved, possibly using some other input gas to saturate links involved in looping (as described earlier). The instant method then preferably continues by selecting a new input volume from a pool that has not yet been closed and that selected volume is then distributed throughout the network as described previously. In the preferred embodiment, this process will continue until there are no input volumes remaining in pools that are not "closed".

Finally, it should be noted that if during the computational process described above the amount of memory that is allocated to the program is insufficient to accommodate the entirety of the distribution (branch) structures for the network, the gas that is currently being traced may be parked at the next pool and the branches/loops that have been identified so far may be processed. Following that, the same memory can be reused, or more space can be allocated, after which the distribution continues starting with the next input volume.

Identifying and Resolving Local Oversupply Situations

The process of distributing gas from external sources within a network is preferably based on priority and the capacity of the outgoing links from each pool; preferably all of the gas that can physically reach a pool will be delivered to that pool. Depending on the capacity of the outgoing links, all the incoming gas will either be able to leave the pool (and this typically will be the case, since the situation has been reduced to a global under-supply), or will partially be "bottled" inside the pool (local oversupply). Generally speaking, it is preferred that local oversupplies not be corrected by actually cutting the access to the pools that have all their outgoing links saturated, because all of the physical receipts should be known before cutting any of them.

So, after the external gas has been distributed, the locally oversupplied pools will be identified (step 735), and their receipts will be cut according to their priority. This procedure is very similar to tracing external injections through the pools, only this time gas is being backed out following the reversed priority order on the pool receipt side, and the link capacities will be equal to the actual amounts of gas that came into these pools during the fill process. All oversupplied pools will then be marked as closed (they cannot receive any gas from now on). This process of backing out through the pools will continue until either the gas cuts are traced to some external receipts (meaning that these receipts should themselves be cut), or until an under-supplied pool is encountered. In this latter case a check should be made to determine whether all or some of this gas could be sent to any under-supplied deliveries, so that the necessary receipt volume cuts are minimized, and the delivery volumes are maximized. However, there could be more than one source of oversupplied gas physically eligible to be sent to supplement an under-supplied delivery, in which case the delivery ranks will come into play again. Summing up, the following processing scheme is preferably utilized.

As a preferred first step, all oversupplied pools should be readily identified, as the amount of gas that came into each pool through incoming links has already been determined. From those pools, gas should be "backed out" through the appropriate links in the reverse order of the receipt priority. As a result, certain gas volumes will be pushed out of the system and back to the external injections that deliver gas into the pool system. These external injections are, thus, to be cut by the amount of gas pushed out. In other instances, some gas volumes will be backed out into other pools (through the incoming pool-to-pool links); if these pools are already saturated or oversupplied, the new summary oversupply volume will be pushed further back based on the priorities of pool receipts, etc. If an under-supplied pool is encountered, the backed-out gas will be left in its input buffer available for the next stage of distribution. All of the links through which this "backing-out" has occurred will be marked as saturated (although they are technically under their capacity, of course). During this step, closed loops might be encountered once again, and they are handled the same way as they were in the case of forward processing.

As a next preferred step, after all of the currently identified oversupplied gas has been processed, another round of gas distribution to the delivery side is performed, with all outgoing links to already identified saturated pools excluded. This procedure can produce some extra gas for the external deliveries, as well as a new set of oversupplied pools.

The previous two steps should be repeated until all oversupply gas is dealt with, maximizing deliveries and minimizing receipt cuts, as was already mentioned. Since a non-zero number of links and pools are eliminated at each step, the whole process will be completed in a finite number of steps.

Figure 2:
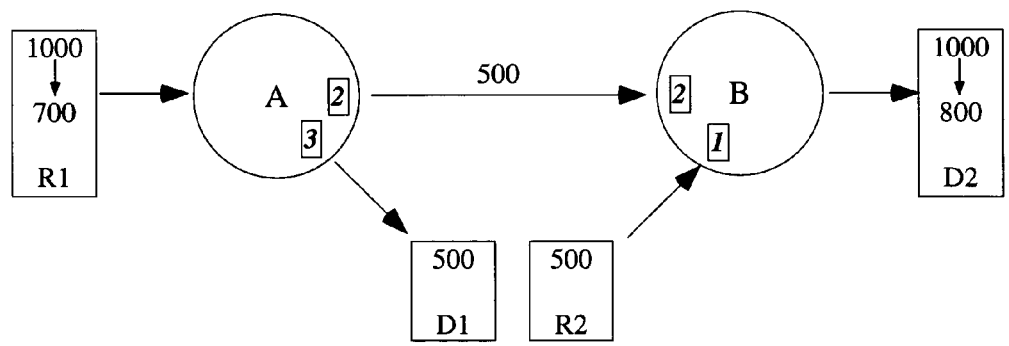
FIG. 2 illustrates a simple gas balancing problem together with its preferred solution.

Consider first the simplified example of FIG. 2 which will be used to illustrate some key aspects of the preferred method. In this case both pools A and B were initially balanced, but in the process of enforcing other constraints within the system the external receipt R1 was cut from 1000 to 700 dt, and the external delivery D2 was cut from 1000 to 800 dt. Note that the total receipts into this simple system (R1+R2=700+500=1200) are less than the total deliveries (D1+D2=1300), thus this is a globally under supplied system. The distribution of external receipts produces:

|  | 700 | → | 500 | + | 200 |  |
|---|---|---|---|---|---|---|
| Pool A: |  |  |  |  |  |  |
|  | (R1) |  | (A → B) |  | (D1) |  |
|  | 500 | + | 500 | → | 800 | + | 200 |
| Pool B: |  |  |  |  |  |  |  |
|  | (R2) |  | (A → B) |  | (D2) |  | Oversupply |

As a consequence of the oversupply, 200 dt will be backed out through the link A→B to pool A (FIG. 2), where it will be used to supplement delivery D1, bringing the total volume for this delivery to 400 dt. So the net result of pool balancing will be a cut of D1 from 500 to 400 dt. The nomination priorities for this, and subsequent, examples have been indicated within FIG. 2 by placement of an italicized integer (its rank) enclosed within a rectangle within each pool; the higher the rank, the lower the priority.

This same branching and "backing-out" technique can be used at the end of the pool balancing procedure in order to connect specific external deliveries to specific external receipts, which is known to those of ordinary skill in the art as tracking gas through the pool system. In this case, receipts and deliveries are tied at each pool by priority (the highest priority deliveries are assigned gas from the receipts of the highest priority, and so on). This is possible because the exact amounts of incoming gas and outgoing gas are already calculated. Then these received amounts are "backed out" into the preceding pools, where the process is repeated, etc. If any closed loops are encountered, they should be handled using the previously described method of loop processing. The task is completed when all of the "back-out" branches reach the external receipt volumes.

Note that the previous result should be contrasted with the traditional pool balancing approach, assuming that pool "A" is selected as a starting point (a 50% chance in practice):

|  | 700 | → | 500 | + | 200 |
|---|---|---|---|---|---|
| Pool A: |  |  |  |  |  |
|  | (R1) |  | (A → B) |  | (D1) |
|  | 500 | + | 300 | → | 800 |
| Pool B: |  |  |  |  |  |
|  | (R2) |  | (A → B) |  | (D2) |
|  | 500 | → | 300 | + | 200 |
| Pool A (again): | (R1) |  | (A → B) |  | (D1) |

Note that this approach results in over-cutting gas volumes by 200 dt on both receipt (R1=500 instead of 700) and delivery side (D1=200 instead of 400).

Figure 5:
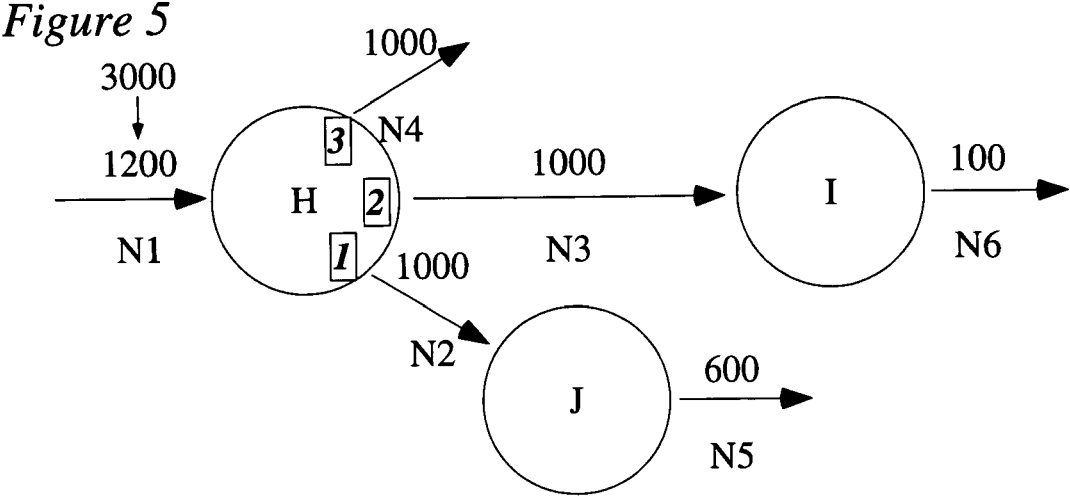
FIG. 5 contains an illustration of another simple gas balancing problem.

FIGS. 5 and 6 illustrate a more complex gas tracing/balancing problem and its solution according to the instant invention will be instructive. The starting point for this scenario, FIG. 5, represents a situation where the entire network is globally undersupplied (N1=1200<N4+N5+N6=1700), but where there are local oversupplies in pools I and J. As a first step, the external receipt into the pool system (N1=1200 into pool H) is distributed according to the priorities of the takeaway nominations, which have been indicated within that pool by italicized integers which are surrounded by rectangles. Using the nomination priorities provided will result in N2=1000 (its rank is equal to 1), N3=200, and N4=0.

Figure 6A:
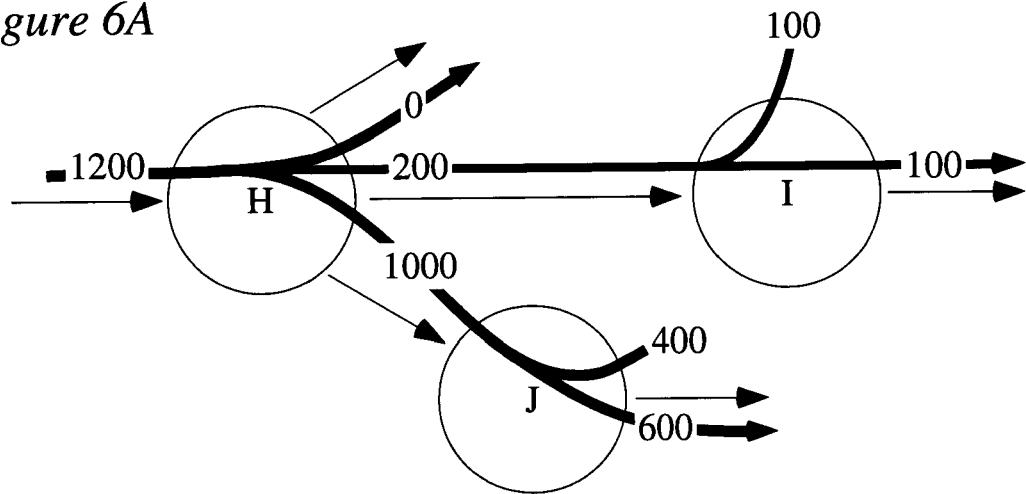
FIGS. 6A and 6B provides a detailed illustration of one aspect of the instant pool balancing method.

As a next step, the amount of gas N2=1000 is injected into pool J, of which 600 is taken by the external delivery N5, and 400 remains in the pool B input buffer (FIG. 6A). Similarly, N3=200 is introduced into pool I, with N6=100, and another 100 remaining in the input buffer of pool I. Both pools I and pool J are then marked as closed. This concludes the forward pass through the pool system.

Figure 6B:
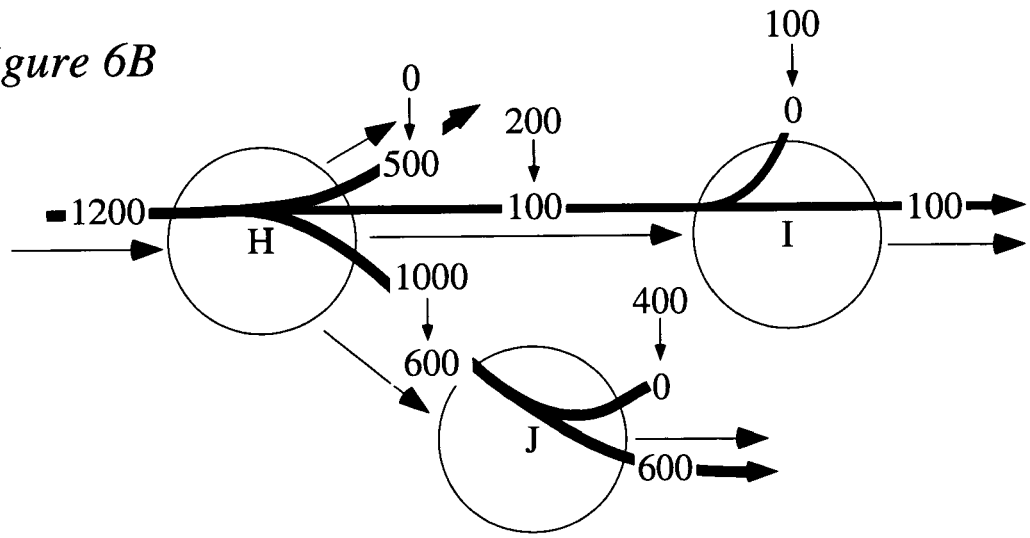

Next, the pools within the network are checked for the presence of gas remaining in their respective input buffers. This extra gas is backed out of the pools through the links that delivered the gas, starting with the lowest priority links (the ranks on the receipt side of the pools are used). As a result and as is illustrated in FIG. 6B, 400 units are backed out from pool J to pool H (now N2=1000−400=600), and 100 units are backed through N3 (N3=200−100=100). Afterward, both links N2 and N3 are marked as saturated. The only extra gas (500 units) remaining within the network is now in pool H, which is still open. This gas is then distributed through the still open links, resulting in N4=500. The final results in this example are N1=1200, N2=600, N3=100, N4=500, N5=600, N6=100.

Pool Tolerance Margin

Instead of balancing pools exactly, some pipelines allow a limited discrepancy between receipts and deliveries for each pool called the tolerance margin, which is usually expressed in terms relative to a share $t<1$ of the pool input R (i.e., the total receipts into the pool). In other words, if a pool is undersupplied, deliveries will be accepted up to a pool volume $R_+ = R(1+t)$, and, for an oversupplied pool with total delivery D, the pool receipts can be reduced not to D, but to $R_- = D/(1−t) > D$.

The instant method accommodates variances due to pool tolerance (steps 738 and 750) by introducing for each pool a special margin bucket that represents a false external delivery out of the pool (the amount of gas that can be left in the pool input buffer), where a negative margin corresponds to a false external receipt (the volume artificially created to pad the pool deliveries). Accordingly, if a local oversupply has been detected, all or part of that volume can be accorded a positive sign and added to the margin bucket. Excess gas will be backed out of the pool only after the margin volume reaches $V_{distr} m_{coef}$, where $V_{distr}$ is the volume delivered, or distributed, out of the pool, and $m_{coef} = t/(1−t)$ in the case of global undersupply, or simply $m_{coef} = t$ for global oversupply, when actual receipts and deliveries have been reversed by the algorithm. After all actually available gas has been distributed, the extra volume will be introduced into the still open pools in an amount not exceeding the current tolerance margin: $V_{extra} = \min(V_{open}, V_{distr} t_{coef})$, where $V_{open}$ is the volume that still can be delivered out of this pool, $V_{distr}$ is the volume already distributed (as already mentioned), and either $t_{coef} = t$ (global undersupply) or $t_{coef} = t/(1−t)$ (global oversupply). This extra volume will also be recorded in the margin bucket with a negative sign.

After this, the newly introduced extra volumes can be distributed using the same general distribution algorithm as before, keeping in mind, however, that each extra volume delivered to another open pool will generate yet another extra volume in that pool (and the corresponding margin volume adjustment), calculated according to the same rules.

Two caveats should be noted. First, it is still possible to end up with another local oversupply situation, since the amount of extra gas is calculated based on the remaining capacity of the outgoing links that are still open ($V_{open}$), but there is no guarantee that all of that capacity can be actually used (for example, if some of these outgoing links lead into a pool that receives too much extra gas at some point during the distribution, and its status is changed to closed). To avoid this situation, a special transaction log is preferably maintained, so that excess gas can be quickly traced back and reduced. Second, the very concept of the tolerance margin implies that some extra volumes are created, in effect, out of nothing. In the case of closed loops, it is possible to have an unlimited growth of the gas volumes—provided that the loop transfer rate is high enough relative to the tolerance margin t and the number of pools n involved in the loop. For the global undersupply scenario and a simple loop that involves n pools, such unlimited growth occurs if $q \geq 1/(1+t)^n$, where q is the loop transfer rate. That is, if a volume V is introduced into one of the pools and traced through the pool configuration, the amount qV will return to that pool after a single pass through the loop. Although such situations are unlikely, in the preferred arrangement this situation will be specifically monitored for and, in such an instance, the loop will be terminated, and the user notified.

Finally, it should be noted that utilization of the instant method will typically result in the pools being balanced exactly even if the pool tolerance t>0, so long as the margin gas at each pool is taken into account.

Rounding the Transaction Volumes

The amounts of gas transferred through the under-supplied links will almost certainly contain a fractional part. Since in many cases the input and output volumes should be integer values, some rounding is generally required (step 765). A straightforward rounding of the link volumes (including links to external receipts and deliveries) could lead to the pools becoming unbalanced again by one or more units. Further, because of the presence of pool-to-pool transactions, rounding the volumes for each pool cannot be done separately. Thus, the instant method employs a preferred technique that is designed to keep the round-off error for each transaction volume under 1 unit of measurement, and that also ensures that all of the pools remain in balance during the rounding process.

In a preferred arrangement, during the process of rounding the transaction volumes all nominations that have not been cut during the balancing process will be excluded from rounding (i.e., they stay at their input volume which, presumably, will already be an integer value), although the volumes themselves will be included in pool balances. The remaining links are then combined so that for each pool there is (at most) one external receipt, one external delivery, no more than one receipt from any other pool, and no more than a single delivery to any other pool. In other words, the relative priorities are not utilized for purposes of this calculation.

As a next preferred step, the summary volumes are properly rounded, after which their individual components at the nomination level can readily be rounded to yield the same total. Since for a balanced pool group the sum of all pool receipts is equal to the sum of all pool deliveries, it should be readily apparent that the pool-to-pool volumes do not affect this condition—each of these volumes participates once on both sides of the equation (once as a receipt, once as a delivery). Therefore, the rounding of external volumes must be done separately, making certain that the sum of rounded external receipts is equal to the sum of rounded external deliveries, with uncut external volumes taken into account as well.

More specifically, each internal summary volume $v_{ij}$ transferred from pool i to pool j) can be rounded according to the following expression:

$$v^R_{ij} = (v_{ij})_{rounded\ down} + E_{ij},$$

where $E_{ij}=0$ or 1. In order to balance each pool k, it is sufficient to require that $$\sum_{(i)} E_{ik} - \sum_{(j)} E_{kj} = F_k,$$

where the value of $F_k$ is calculated based on the initial rounded (downward) internal volumes, rounded external volumes, and uncut volumes related to the pool k. As a result, the rounding task is reduced to finding a set of variables $\{E_{ij}\}$ that satisfy these balancing conditions. Note that the $\{E_{ij}\}$ are only potentially non-zero where pools i and j are directly connected to each other, and, as was described previously, the maximum possible value for this variable is unity, thus ensuring that the rounding error does not exceed 1.

The initial values $\{E_{ij}\}$ are assigned so as to keep the difference between the running sums of exact and rounded volumes for each pool to a minimum. After that, the residual "internal imbalance" at each pool k should be reduced to the target value of $F_k$, preferably according to the following two operational rules.

First, the residual imbalance of 1 can be transferred from pool i to pool provided that the current value of either $E_{ij}$ or $E_{ji}$ allows such transfer (for example, the residual imbalance at pool i can be reduced, and the residual imbalance at pool j increased, by changing the value of $E_{ij}$ from 0 to 1).

Second, the residual imbalance which results from setting $E_{ij}$ equal to unity can be transferred through pool i by making simultaneous (and similar) changes to one of the incoming and one of the outgoing summary links (for example, a unit of the residual imbalance can be "pushed" from pool l to pool m across pool i by changing $E_{li}$ from 0 to 1, and changing $E_{im}$ from 0 to 1, provided that $E_{li}$ and $E_{im}$ exist and have proper current values).

After identifying, for example, a pool wherein the residual imbalance needs to be increased to reach the target value of F, one of the standard tree search methods ("width-first") is preferably used to find a pool where the residual imbalance should be decreased. Since only paths that satisfy the above rules are considered, the imbalance transfer can then be accomplished.

Finally, if non-zero tolerance margin is requested, the processing can be simplified by skipping those pools where the initial rounding leaves result within the stated tolerance margin. For the remaining pools, the margin gas should be included along with the actual external volumes.

Calculating the $\{d_{sk}\}$ Coefficients

The discussion that follows will be limited to the case of outgoing links only, but those of ordinary skill in the art will recognize that the same calculations may readily be performed for incoming links as well. For purposes of the instant discussion, a group of outgoing links from a pool that all have the same rank will be referred to as a level. A level will be considered to be "open" if it includes all links with the highest priority that are not yet saturated. That is, these links have the capacity to accept some additional gas volume.

As was generally explained previously, the $\{d_{sk}\}$ coefficients are calculated as a pro rata share of the total outgoing volume of a pool which is based on the amount that each particular link (s→k) can still accommodate. When the current open level configuration changes, or when no additional pool volume is available, the actual amounts sent through each link are calculated and added to the amount sent previously (if any). These summary amounts constitute the output volume for each nomination $N_i$.

So in a preferred arrangement, the initial nominated pool-to-pool volumes are used as the basis for the calculation of an initial set of $\{d_{sk}\}$, just as the nominated external receipts form the array of initial $\{A_S\}$. By way of example, suppose that there are two outgoing links from pool A, leading to pools B and C respectively. The corresponding nominated volumes, N1 and N2, are equal to 500, with the respective links being assumed to have the same rank. These assumptions yield initial calculated values of $d_{AB}=d_{AC}=0.5$. Assuming further that $A_A=1200$ (the volume coming to pool A from external sources), then if it is assumed that pool C can accept only a volume of 400, the currently open configuration will terminate after a volume of 800 has been distributed from pool A (N1=400, and N2=400). After that, the next open configuration will consist of only link N1, with the remaining open capacity of 100, and new $d_{AB}=1.0$.

The volume remaining in pool A that is still available for distribution may be calculated to be 1200−800=400, so 100 of that amount will go to pool B, which will result in a new value for N1=400+100=500. If there are more outgoing links with lower priority leading from pool A to other pools and to external deliveries, they will compete for the remaining volume of 300 still available at A—again, according to their ranks. If, on the other hand, there are no other nominations that can take any of the volume from A, the incoming volume will necessarily be cut by 300 according to the ranks of incoming links.

It should be noted that the previous simplified example, if fully solved via the methods taught herein, would actually deliver the full 500 to pool C, and, after establishing that there is an oversupply of 100 at C, the excess volume would be backed out into the pool A, and the link N2 will be marked as saturated.

Finally, it follows from the previous discussion that the set of $\{d_{sk}\}$ values should be recalculated each time one of the links within the currently open pool level becomes saturated, so long as there are still other open links within that pool level. Of course, in such a circumstance the other still-open links will share all of the volume available for distribution from that point on, unless, of course, another link or the entire level becomes saturated.

Additional Computational Examples

Figure 3:
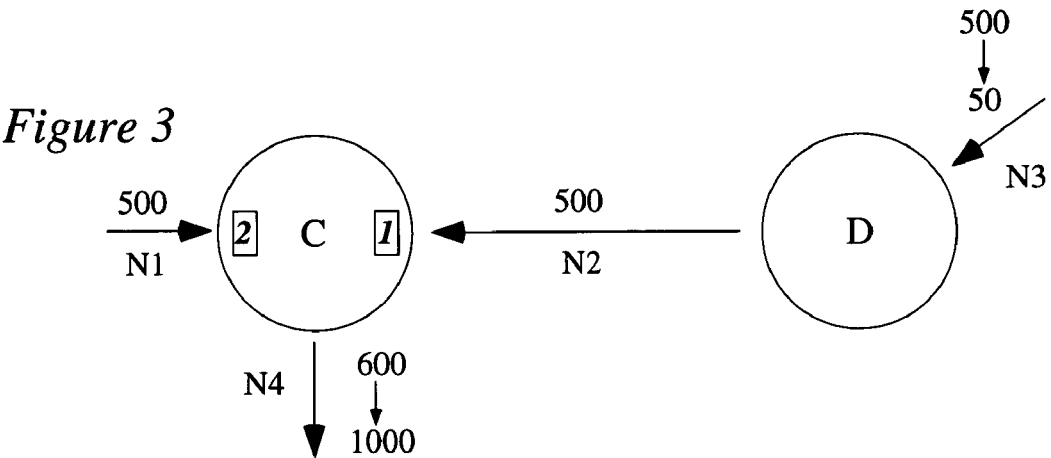
FIG. 3 contains another simplified gas balancing problem and solution.

As is illustrated in FIG. 3, conventional approaches to pool balancing can result in problems in even small pool systems. The pools in this figure were nominated in balance (N1+N2=N4=1000 for pool C, N2=N3=500 for pool D), but suppose that for reasons of other constraints (e.g., transportation limitations) nominations N3 and N4 have been cut to 50 and 600 units respectively and conventional balancing is to be applied.

If pool C is the first to be balanced (and in cases of any complexity the selection of a starting point and the order of balancing is quite arbitrary), then receipts into the pool (N1+N2) should now be cut to N4=600. Since there is more than one nomination in the group to be cut, the nomination ranks come into effect—the lower the rank, the higher the priority. This means that nomination N1 (rank 2 in FIG. 4) should be cut before nomination N2 (rank 1). So N1 should be cut from 500 to 100 in order to balance that pool. As a next step, pool D is balanced, which results in N2=N3, or N2 is to be reduced from 500 to 50. Of course, after that, pool C has to be balanced again, and this time the delivery side has to be cut to N4=N1+N2, or N4 must be cut from 600 to 150.

It should be noted that the cuts to N1 and N4 are clearly excessive, as may be verified by direct examination. Indeed, it is sufficient to cut N4 to 550, and leave N1 unmodified at 500.

The example of FIG. 3 illustrates the weakness of any approach based on an analysis of one pool at a time. The conventional analysis fails, because it presupposes that all the current volumes entering and leaving that pool are actually available, including the pool-to-pool transactions (in this case, N2). In many cases, this simply is not true.

However, if the scenario of FIG. 3 is balanced using the instant method, the results are much better. As a first step, it is important to recognize that this is a global under-supply situation (external receipts into the pool system add up to N1+N3=550, whereas external deliveries out of the pools total N4=600). Introducing N1=500 units of gas into pool C results in assigning all this gas to N4. So, at least initially, N4=500. Tracing the next receipt—N3 into pool D—through the pools produces a reduction of N2 from 500 to 50, and then N4=500+50=550 (50 units are transferred into pool C by nomination N2, where that gas is given to N4, increasing that nomination volume from 500 to 550—still under the maximum amount of 600 that this nomination can take. Note that it does not make any difference whether N1 or N3 is traced first. Final answers: N1=500, N2=50, N3=50, N4=550.

Figure 4:
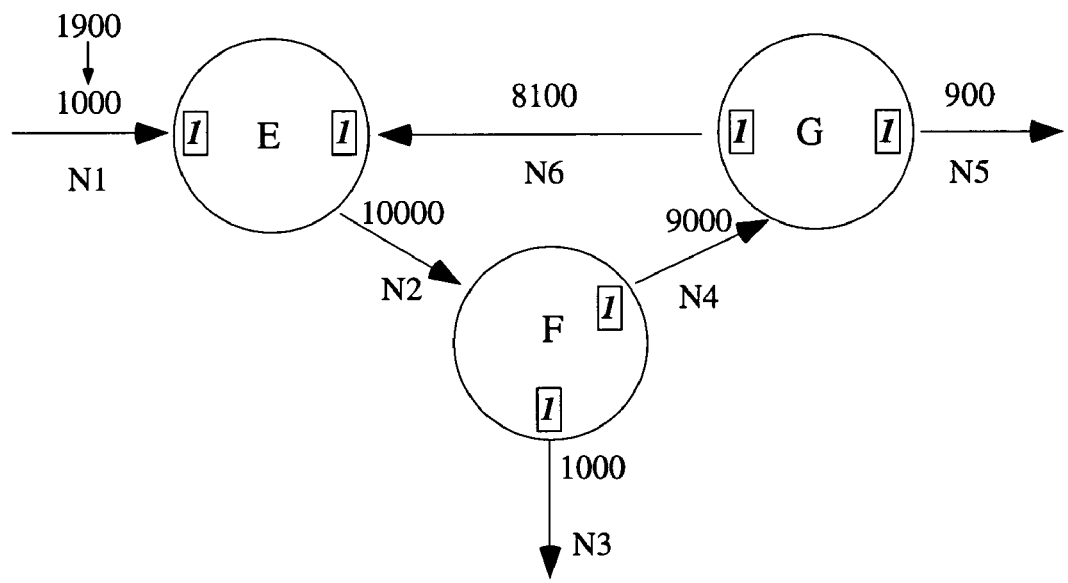
FIG. 4 illustrates a simple gas balancing problem together with its solution.

Turning now to the more complex example of FIG. 4, the simple closed loop (E→F→G→E) in this figure was initially balanced, but after nomination N1 is cut for external reasons, pool balancing becomes necessary. In a conventional analysis, nomination N2 would be reduced to 9100 (to balance pool E), then N3 would be reduced from 1000 to 910, and finally N4 would be reduced from 9000 to 8190 in order to complete the balancing of pool F (N3 and N4 have the same rank 1, and are reduced proportionately). After that, balancing pool G results in N5 being cut from 900 to 819, and N6 being reduced from 8100 to 7371. Now, of course, pool E has to be re-balanced, and so on.

Those of ordinary skill in the art will recognize that it requires 46 passes through the three pools until the final results are obtained with sufficient precision, i.e., until N2=5263, N3=526, N4=4737, N5=474, N6=4263. In fact, it can be noted that mathematically this simple case corresponds to the calculation of a sum of an infinite geometric progression where the ratio of a term to its predecessor equals 0.81 and, as a consequence, the convergence of this method is predictably slow. Of course, the number of passes through each pool becomes much greater when the complexity of the loops begins to approach the real cases. At the same time, the traditional approach does not have any means to isolate the pools participating in closed loops, so each pass involves all the existing pools, which further magnifies the number of calculations.

On the other hand, when this same pool configuration is balanced by the instant method, the exact solution may be immediately obtained. Beginning with pool E and its input from the available external sources (nomination N1), in the terminology established previously $A_E=1000$. This pool has a single outgoing link which leads to pool F and, thus, $d_{EF}=1$. Turning next to pool F, this pool has no input from external sources ($A_F=0$) and two outgoing links of the same rank, which means that:

$$d_{FG} = \frac{9000}{9000+1000} = 0.9.$$

Finally, and turning to pool G, it has no input from internal sources ($A_G=0$) and two outgoing links of the same rank=1. Thus, $$d_{GE} = \frac{8100}{8100+900} = 0.9.$$

Therefore, according to the method described previously the instant pool configuration gives rise to the following system of equations:

$$A_E + d_{GE}V_G = V_E$$

$$A_F + d_{EF}V_E = V_F$$

$$A_G + d_{FG}V_F = V_G,$$

Which may be rewritten as $$1000 + 0.9 V_G = V_E,$$

$$V_E = V_F,$$

$$0.9 V_F = V_G.$$

Since $V_G = 0.9 V_F = 0.9 V_E$, the first equation can be rewritten to yield $$1000 + 0.81 V_E = V_E,$$

so that $$V_E = 1000/(1-0.81) = 5263.$$

Thus, it immediately follows that $$V_F = V_E = 5263, \text{ and}$$

$$V_G = 5263 * 0.9 = 4737.$$

Since all the input gas from pool E is taken by the nomination N2, N2 can be calculated to be $N2 = V_E = 5263$. The volume available at pool F is split between N3 and N4 in proportion 1000 to 9000, or 1 to 9. Therefore, $$N3 = 0.1 V_F = 526, \text{ and}$$

$$N4 = d_{FG} V_F = 0.9 V_F = 4737.$$

Finally, the volume available at pool F is split between N5 and N6 in proportion 900 to 8100, or 1 to 9. So that $$N5 = 0.1 V_G = 474,$$

$$N6 = d_{GE} V_G = 0.9 V_G = 4263,$$

where all of the previous calculation have been rounded to the nearest integer value.

CONCLUSIONS

In summary, the instant invention provides at least four advantages over the methods utilized in the prior art. First, the gas cuts that might be required in order to balance the pools in the network are minimized, which results in savings for the pipeline and better service for the customer. Second, closed gas transfer loops that are likely to occur because of multiple pool-to-pool transactions are identified and resolved in a single step, which can greatly reduce the computation time and increase the precision of the calculated results. Third, the rules and priorities that have been established for pool balancing by NAESB and other standards or regulatory groups are strictly enforced not only at the local (pool) level, but also at the global (e.g., all interacting pools) level. As a result, the output from the instant method does not depend on the arbitrary order in which individual pools are processed. Finally, by utilizing the methods taught herein it is possible to determine all of the external receipts that have contributed gas to each external delivery; in other words, pool tracking is possible.

It should be noted and remembered that the method will be implemented on a programmable computer that includes programming instructions stored therein for execution by its microprocessor, which programming instructions define the computer's response to the various pool inputs and outputs. Although ROM is the preferred apparatus for storing such instructions, static or dynamic RAM, flash RAM, EPROM, PROM, EEPROM, or any similar volatile or nonvolatile computer memory could be used. Further, it is not absolutely essential that the software be permanently resident within the RAM of the computer, although that is certainly preferred. It is possible that the operating software could be stored, by way of example, on a floppy disk, a magnetic disk, a magnetic tape, a magneto-optical disk, an optical disk, a CD-ROM, flash RAM card, a ROM card, a DVD disk, or loaded into the computer over a network as needed. Thus, "program memory" as that term is used herein should be interpreted in its broadest sense to include the variations listed above, as well as other variations that are well known to those of ordinary skill in the art.

Thus, it is apparent that there has been provided, in accordance with the invention, a pool balancing method that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of analyzing and balancing one or more logical pools in a gas transmission network for the purpose of scheduling the movement of gas through the gas transmission network, wherein the method is executed as a computer program on a digital computer, the method comprising the steps of:
    (a) identifying at least one logical pool within said gas transmission network, each of said identified pools having at least one input link and one output link,
        (i) wherein each of said pool input links either connects two of said identified pools together or is associated with an external receipt, and
        (ii) wherein each of said pool output links either connects two of said identified pools together or is associated with an external delivery;
    (b) determining for each of said identified pools an input amount of gas available for that pool, wherein said input amount of gas available for each pool is greater than or equal to zero;
    (c) for each of said identified pools for which said input amount of gas available is greater than zero, using said pool output links to numerically distribute said input amounts of gas through said identified pools until each of said input amounts of gas reaches an external delivery;
    (d) deriving a pool balance solution according to the numerical calculation of step (c); and
    (e) outputting from the digital computer the pool balance solution for the identified pools.

2. A method according to claim 1, wherein each of said output links has an output link priority associated therewith, and step (c) comprises the steps of:
    (c1) for each of said identified pools for which said input amount of gas available is greater than zero, using said pool output links and said outgoing link priorities to numerically distribute said input amounts of gas through said identified pools until each of said input amounts of gas reaches an external delivery.

3. A method according to claim 1, wherein is provided a tolerance margin for each of said identified pools, and wherein step (c) comprises the step of:
(c1) for each of said identified pools for which said input amount of gas available is greater than zero, using said pool output links to numerically distribute said input amounts of gas through said identified pools until each of said input amounts of gas reaches an external delivery;
(c2) determining whether step (c1) resulted in volume cuts for any of said identified pools, and,
(c3) if any of said volume cuts have resulted for a particular pool from among said identified pools, reducing the amounts of said volume cuts for said particular pool by an amount approximately equal to a tolerance margin for said particular pool.

4. A method according to claim 1, wherein said identified pools taken together form at least one closed loop, and wherein step (c) comprises the steps of:
(c1) for those pools for which said input amount of gas available is greater than zero, using said pool output links and said outgoing link priorities to numerically distribute said input amounts of gas through said identified pools, each of said input amounts of gas being traced via said pool output links through said identified pools until each of said input amounts of gas either
(1) reaches an external delivery, or
(2) at least a portion of said input amounts of gas returns to the pool from which it began, thereby indicating the presence of one of said closed loops,
(c2) selecting at least one of said closed loops, each of said selected closed loops being comprised of a plurality of said identified pools, all of said pools comprising said selected closed loops being taken together forming a pool group,
(c3) selecting said pools in said pool group and said output links associated therewith,
(c4) determining a distribution coefficient associated with each of said selected output links,
(c5) calculating a total gas input for each of said selected pools in said pool group,
(c6) replacing said input gas amounts for each selected pool in said pool group with said calculated total gas input for said same pool,
(c7) numerically distributing said total gas input within said selected pools in said pool group according to said distribution coefficients, and,
(c8) numerically distributing said total gas input remaining after step (c7) to pools outside of the selected pools in said pool group and to external deliveries.

5. A method according to claim 1, where all of said identified pools are in fluid communication with each other.

6. A method according to claim 4, wherein step (c5) comprises the steps of:
(i) determining for each of said selected pools in said pool group an input amount of gas available for that pool,
(ii) determining at least from said selected pools in said pool group and said input links and output links corresponding thereto, a topology of said selected closed loops, said topology comprising at least a plurality of links interconnecting each of said pools within said pool group,
(iii) expressing at least a portion of said topology and said determined input amount of gas available for each selected pool within said pool group as a system of equations, wherein said system of equations is solvable for estimates of a total amount of gas to be distributed to each of said pools within said selected pool group, and,
(iv) solving said system of equations to obtain estimates of said total amounts of gas to be distributed to each of said gas pools within said selected pool group.

7. A method according to claim 1, wherein steps (a) through (c) are performed in the order listed.

8. A method according to claim 1, wherein step (c) comprises the steps of:
(c1) for each of said identified pools for which said input amount of gas available is greater than zero, using said pool output links to numerically distribute said input amounts of gas through said identified pools until each of said input amounts of gas either reaches an external delivery or until it reaches an oversupplied pool,
(c2) examining said identified pools to determine whether said numerical distribution of said input amounts of gas resulted in a local oversupply of gas within any of said identified pools,
(c3) for any of said identified pools which is locally oversupplied with gas, numerically distributing said local oversupplied gas until said oversupplied gas reaches one of said external receipts or until said oversupplied gas reaches one of said identified pools that is undersupplied with gas, wherein if any of said oversupplied gas reaches one of said identified pools that is undersupplied, at least a portion of said oversupplied gas is added to said input amount of gas available to said undersupplied pool.

9. A method according to claim 8, further comprising:
(c4) determining for each of said identified pools a new input amount of gas available for that pool after application of step (c3), wherein said input amount of gas available for each pool is greater than or equal to zero, and,
(c5) repeating steps (c1) through (c4) until there are no more input amounts of gas remaining.

10. A method according to claim 8, wherein step (c3) comprises the steps of:
(i) calculating distribution coefficients for each of said identified pools which is locally oversupplied with gas, and,
(ii) for any of said identified pools which is locally oversupplied with gas, numerically distributing said local oversupplied gas according to said distribution coefficients until said oversupplied gas reaches one of said external receipts or until said oversupplied gas reaches one of said identified pools that is undersupplied with gas, wherein if any of said oversupplied gas reaches one of said identified pools that is undersupplied, at least a portion of said oversupplied gas is added to said input amount of gas available to said undersupplied pool.

11. A method according to claim 10, wherein each of said input links has a link priority associated therewith, and wherein step (i) comprises the step of calculating distribution coefficients for each of said identified pools which is locally oversupplied with gas according to said input link priority.

12. A method according to claim 1, wherein step (b) comprises the steps of:
(b1) determining for each of said identified pools a current input amount of gas available for that pool,
(b2) using said current input amount of gas available for each pool to determine whether said identified pools are oversupplied with gas, and, (b3) if said identified pools are oversupplied with gas, mathematically modifying said current input amounts of gas available for each pool to make said identified pools undersupplied with gas.

13. A method according to claim 12, wherein step (b3) comprises the step of numerically reversing the flow direction for each of said identified pools by changing output links to input links.

14. A method according to claim 8, wherein each of said output links has a link capacity associated therewith, and wherein step (c1) comprises:
   (c1) for those pools for which said input amount of gas available is greater than zero, using at least said pool output links, said outgoing link priorities, and said link capacities to numerically distribute said input amounts of gas through said identified pools, said input amounts of gas being traced via said pool output links through said identified pools
      (1) until each of said input amounts of gas reaches an external delivery, or
      (2) until at least apportion of each of said input amounts of gas returns to the pool from which it began, thereby indicating the presence of one of said closed loops.

15. A method according to claim 14, wherein each of said output links has a link capacity associated therewith, and wherein the step of using at least said pool output links, said outgoing link priorities, and said link capacities to numerically distribute said input amounts of gas through said identified pools, said input amounts of gas being traced via said pool output links through said identified pools comprises the step of using at least said pool output links, said outgoing link priorities, and said link capacities to numerically distribute said input amounts of gas through said identified pools, said input amounts of gas being traced via said pool output links through said identified pools up to the capacity of said output links.

16. A storage device adapted for use by a digital computers wherein a plurality of computer instructions defining the method of claim 1 are operably encoded onto said storage device and wherein said digital computer is configured to read the instructions encoded onto the storage device to perform said method.

17. A storage device according to claim 16, wherein said storage device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

18. A method of balancing a plurality of interconnected logical gas pools on a gas transmission network for the purpose of scheduling the movement of gas through the gas transmission network, wherein each of said pools is in fluid communication with each of the others, and, wherein each of said gas pools has at least one input and one output associated therewith, each of said pool inputs either directly connecting two of said gas pools together or being associated with an external gas receipt, and each of said pool outputs either directly connecting two of said gas pools together or being associated with an external delivery, wherein the method is executed as a computer program on a digital computer; the method comprising the steps of:
   (a) determining for each of said identified pools a total amount of gas available for that pool through all of said at least one pool inputs;
   (b) determining at least from said gas pools and said gas pool inputs and outputs a topology of said gas pools, said topology comprising at least a plurality of links interconnecting each of said gas of pools;
   (c) expressing at least a portion of said topology and said determined amount of gas available for each identified pool as a system of equations, wherein said system of equations is solvable for estimates of a total amount of gas to be distributed to each of said identified pools;
   (d) solving said system of equations to obtain estimates of said total amounts of gas to be distributed to each of said gas pools; and,
   (e) using said obtained estimates of the total amounts of gas to be distributed to each of said identified pools to obtain a pool balance solution for said plurality of pools; and
   (f) outputting from the digital computer the pool balance solution for the plurality of pools.

19. A method according to claim 18, wherein steps (b) through (d) are performed in the order listed.

20. A method according to claim 18, wherein said system of equations of step (c) is a linear system of equations.

21. A method according to claim 18, wherein step (a) comprises the steps of:
   (a1) determining for each of said gas pools a current input amount of gas available for that pool,
   (a2) using said current input amount of gas available for each pool to determine whether said identified pools are oversupplied with gas, and,
   (a3) if said identified pools are oversupplied with gas, mathematically modifying said current input amounts of gas available for each pool to make said identified pools undersupplied with gas.

22. A method according to claim 21, wherein step (a3) comprises the step of numerically reversing the flow direction for each of said identified pool by changing outputs to inputs.

23. A storage device adapted for use by a digital computer, wherein a plurality of computer instructions defining the method of claim 18 are operably encoded onto said storage device and wherein said digital computer is configured to read the instructions encoded onto the storage device to perform said method.

24. A storage device according to claim 23, wherein said storage device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

* * * * *

UNITED STATES PATENT AND TRADEMARK OFFICE
CERTIFICATE OF CORRECTION

PATENT NO. : 7,587,326 B1 Page 1 of 1
APPLICATION NO. : 10/463144
DATED : September 8, 2009
INVENTOR(S) : Rafail Glatman It is certified that error appears in the above-identified patent and that said Letters Patent is hereby corrected as shown below:

On the Title Page, Item (73) Assignee should be "Williams Gas Pipeline Company, LLC"
Column 5, Line 48 should read "and W are"
Column 9, Line 35 should read "again. If"
Column 20, Line 13 should read "pool j provided"

Signed and Sealed this

Twenty-fourth Day of November, 2009

David J. Kappos
*Director of the United States Patent and Trademark Office*